H. W. THOMASSON.
SEEDING MACHINE.
APPLICATION FILED DEC. 7, 1917.
1,286,837.
Patented Dec. 3, 1918.
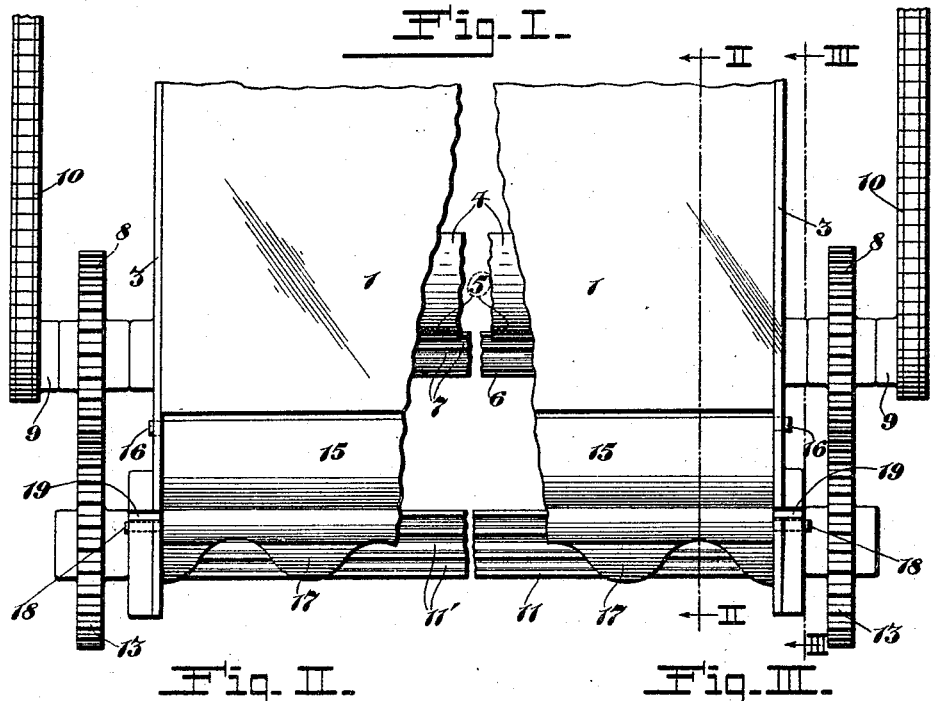
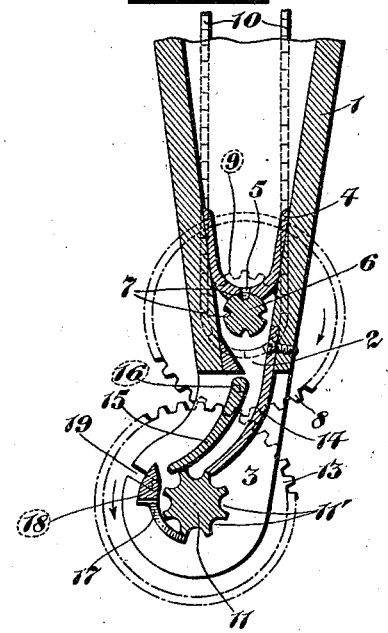
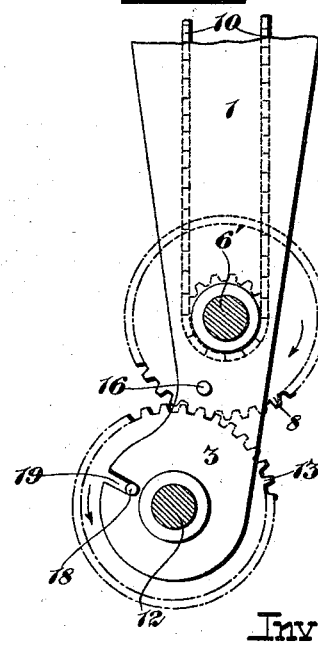
Attest:
Charles A. Becker.
Inventor.
H. W. Thomasson,
By Knight & Cook
His Attorneys.

UNITED STATES PATENT OFFICE.

HUGH W. THOMASSON, OF ST. LOUIS, MISSOURI.

SEEDING-MACHINE.

1,286,837.

Specification of Letters Patent.  Patented Dec. 3, 1918.

Application filed December 7, 1917. Serial No. 206,073.

*To all whom it may concern:*

Be it known that I, HUGH W. THOMASSON, a citizen of the United States of America, a resident of the city of St. Louis, State of Missouri, have invented certain new and useful Improvements in Seeding-Machines, of which the following is a full, clear, and exact description, reference being had to the accompanying drawings, forming a part of this specification.

My invention relates to a seeding machine of the kind which may be termed broadcast seeders, the invention having for its object to provide a machine of this kind of simple and inexpensive construction which may be utilized in the sowing of either small or large seeds, and through the medium of which seeds may be scattered uniformly over the surface of the ground intended to receive them.

Figure I is a rear elevation of my seeding machine with the central portion of the machine broken out.

Fig. II is a vertical section taken on line II—II, Fig. I.

Fig. III is an end view with parts shown in vertical section taken on line III—III, Fig. I.

In the drawings, 1 designates a main seed hopper which may be supported in any suitable manner by ground wheels (not shown). The hopper is provided at its bottom with a discharge throat 2 through which the seed to be planted escapes, and at each end of the hopper and depending therefrom are vertical supporting wings 3, the utility of which will hereinafter appear.

Within the main hopper 1 is a subhopper or feed plate 4, which is located near the bottom of the main hopper and is provided with a narrow longitudinal slot 5. This subhopper is removably mounted in the main hopper and is intended to be used only when the machine is utilized for sowing small seeds, which will readily pass through the narrow slot 5.

6 designates an upper feeding cylinder extending longitudinally in the main hopper 1 beneath the subhopper 4, said cylinder being arranged to revolve in contact with the bottom of the sub feed hopper and having longitudinal pockets 7 therein, which receive the seed as it passes through the slot in the subhopper and discharges such seed so that it may descend through the discharge throat 2 of the main hopper. The upper feed cylinder 6 has shaft extensions 6' extending exteriorly of the main hopper 1, said shaft extensions having wheels 8 fixed thereto and being provided with means whereby they may be driven, the means shown for this purpose comprising sprocket wheels 9 having sprocket chains 10 fitted thereto, which serve to convey power from some rotating part of the seeding machine, for example, its axle.

11 designates a lower feed cylinder extending longitudinally between the supporting wings 3 and therefore longitudinally of the main hopper 1 beneath its discharge throat 2. This lower feed cylinder is grooved, or fluted, providing longitudinal pockets 11', and is provided with shaft extensions 12 mounted in the supporting wings 3, said shaft extensions having fixed thereto driving wheels 13 arranged in mesh with the wheels 8 on the shaft extensions of the upper feed cylinder 6.

14 designates a curved runway plate, extending downwardly from the rear wall of the main hopper 1 and on which the seed discharged through the outlet throat of the main hopper descends to become deposited in the longitudinal pockets in the lower feed cylinder 11, the lower edge of said member 14 being so disposed that the ridges of said feed cylinder will move in close proximity thereto, as indicated in Fig. II. A curved wiper plate 15 arranged parallel with the runway plate 14 has its upper portion pivotally fitted at 16 to the supporting wings 3 and its lower free edge rests idly upon the lower feed cylinder so that said wiper plate may vibrate during rotation of the lower feeding cylinder and perform a wiping action with respect to each pocket in the feeding cylinder, in order that only a predetermined quantity of seed will be carried by each pocket of said cylinder after deposit therein from the passageway between the members 14 and 15.

17 designates a curved seed distributing plate located in front of and extending rearwardly beneath the lower feed cylinder 11. This seed distributing plate has a wavelike rear free edge which lies in close proximity to the periphery of the lower feed cylinder and said plate is supported by pivot studs 18 disposed in inclined slots 19 extending downwardly and rearwardly from the front edges of the supporting wings 3 toward the axis of the feed cylinder 11. The upper portion of the feed distributing plate 17 is weighted, as seen in Fig. II, to provide for the lower free rear portion of said plate being held upwardly toward the cylinder 11 while the slots 19 provide for movement of the entire plate 17 away from the periphery of the cylinder 11.

I have hereinbefore mentioned that the subhopper 4 is intended to be used only when small seeds are being planted, said subhopper in combination with the upper feed cylinder 6 serving to provide for a restricted and predetermined degree of delivery of small seed to the lower feed cylinder 11. When larger seeds are to be sown, the subhopper 4 is removed from the main hopper and the seed descends past the upper feed cylinder 6, moving directly to the lower feed cylinder 11 through the passageway between the runway plate 14 and the wiper plate 15. In sowing either the smaller of larger sized seeds intended to be sown by the use of my seeding machine, both the upper and lower feed cylinders 6 and 11 are rotated constantly through the medium of the mechanism provided for their rotation, the cylinders turning in opposite directions as indicated by the arrows, Figs. II and III. If the seeds are small the wiper plate 15 performs a wiping action across the longitudinal pockets in the lower feed cylinder, with the result that each pocket carries only sufficient seed to fill it as it passes beyond the wiper plate, and this seed is then carried in the pocket while the latter is traversing the distributing plate 17 preparatory to the discharge of the seed onto the ground. If larger seeds are being sown, some of them project from the pockets in the lower cylinder, and the wiper plate 15, being pivotally mounted, moves upwardly to permit the passage of the filled pocket beneath the lower edge of the wiper plate, and as the pockets so filled reach the distributing plate 17 the seed therein presses against the distributing plate, forcing the latter slightly away from the periphery of the lower feed cylinder. The movement of the distributing plate at this time is possible, due to the fact that it is pivotally mounted and supported in the inclined slots 19.

The distributing plate 17, having a wave-like free edge, provides for the seed in the longitudinal pockets of the lower feed cylinder being well scattered onto the ground instead of falling thereto in a straight stream, as would be the case if the edge of said distributing plate were straight.

While I have described the member 4 as a subhopper, it is obvious that the same result would be obtained if this member were not of hopper shape. I therefore do not limit myself to its being of said shape.

I claim:

1. In a broadcast seeding machine, a seed holder having a discharge runway, a feed cylinder beneath said runway, and a curved distributing member located in front of and extending rearwardly beneath said feed cylinder, said distributing member being movable relative to said cylinder.

2. In a broadcast seeding machine, a seed holder having a discharge passageway, a feed cylinder beneath said passageway and a pivotally mounted curved seed distributing member extending rearwardly beneath said cylinder and movable toward and away from the periphery of said cylinder.

3. In a seeding machine, a seed holder having a discharge passageway, and feed cylinder beneath said passageway and a seed distributing member slidably arranged adjacent to the periphery of said feed cylinder and movable toward and away from the periphery of said cylinder.

4. In a broadcast seeding machine, a seed holder having a discharge passageway comprising a wiper plate, a grooved feed cylinder beneath said passageway movably in contact with said wiper plate, and a pivotally mounted curved seed discharging member extending beneath said feed cylinder whereby seed is caused to be discharged rearwardly from said cylinder.

In testimony that I claim the foregoing I hereunto affix my signature.

HUGH W. THOMASSON.

Copies of this patent may be obtained for five cents each, by addressing the "Commissioner of Patents, Washington, D. C."